United States Patent
Hammes et al.

(10) Patent No.: US 12,025,689 B2
(45) Date of Patent: Jul. 2, 2024

(54) METHOD AND SYSTEM FOR TARGET DETECTION USING MIMO RADAR

(71) Applicants: IEE INTERNATIONAL ELECTRONICS & ENGINEERING S.A., Echternach (LU); UNIVERSITÉ DU LUXEMBOURG, Esch-sur-Alzette (LU)

(72) Inventors: Christian Hammes, Gillenfeld (DE); Bhavani Shankar Mysore Rama Rao, Luxembourg (LU); Björn Ottersten, Luxembourg (LU); Udo Schröder, Föhren (DE)

(73) Assignee: IEE International Electronics & Engineering S.A. and Université du Luxembourg, Echternach (LU)

( * ) Notice: Subject to any disclaimer, the term of this patent is extended or adjusted under 35 U.S.C. 154(b) by 921 days.

(21) Appl. No.: 16/979,101

(22) PCT Filed: Mar. 8, 2019

(86) PCT No.: PCT/EP2019/055882
§ 371 (c)(1),
(2) Date: Sep. 8, 2020

(87) PCT Pub. No.: WO2019/170878
PCT Pub. Date: Sep. 12, 2019

(65) Prior Publication Data
US 2020/0400808 A1    Dec. 24, 2020

(30) Foreign Application Priority Data

Mar. 8, 2018 (LU) .................................. LU100731
Jul. 23, 2018 (LU) .................................. LU100881

(51) Int. Cl.
*G01S 13/42* (2006.01)
*G01S 7/35* (2006.01)
(Continued)

(52) U.S. Cl.
CPC .............. *G01S 13/426* (2013.01); *G01S 7/35* (2013.01); *G01S 13/325* (2013.01); *G01S 13/931* (2013.01)

(58) Field of Classification Search
CPC ........ G01S 7/35; G01S 13/426; G01S 13/325; G01S 13/931
See application file for complete search history.

(56) References Cited

U.S. PATENT DOCUMENTS 9,356,671 B1   5/2016  Lee et al.
2006/0202885 A1*  9/2006  Chen ..................... G01S 13/003
                                                342/134
(Continued)

OTHER PUBLICATIONS

Fuhrmann et al ("Transmit beamforming for MIMO radar systems using signal cross-correlation"), doi: 10.1109/TAES.2008.4516997. (Year: 2008).*
(Continued)

*Primary Examiner* — Bernarr E Gregory
*Assistant Examiner* — Hailey R Le
(74) *Attorney, Agent, or Firm* — Reising Ethington P.C.

(57) ABSTRACT

A method of sensing a target in a target detection system having processing circuitry and a multiplexer coupled to the processing circuitry and to a plurality $N_T$ of transmit antennas forming a sparse transmit uniform linear array (ULA), the multiplexer being configured to generate multiplexed and phase modulated transmit signals ($T_1 \ldots T_{NT}$) based on signals from a local oscillator. The processing circuitry receives signals via a plurality $N_R$ of receive antennas forming a dense receive ULA. The method includes transmitting the transmit signals via the transmit antennas as a
(Continued)

general radiation pattern corresponding to a block circulant probing signal matrix, and receiving via the receive antennas receive signals resulting from backscattering of the transmit signals transmitted towards K targets. The method further includes processing the received reflection signals to determine the presence, range and/or angular position of a target within a field of view of the transmit antennas.

14 Claims, 4 Drawing Sheets

(51) Int. Cl.
*G01S 13/32* (2006.01)
*G01S 13/931* (2020.01)

(56) References Cited

U.S. PATENT DOCUMENTS

| | | | | |
|---|---|---|---|---|
| 2007/0243827 | A1* | 10/2007 | Sayeed | H04W 28/06 455/67.11 |
| 2014/0185481 | A1* | 7/2014 | Seol | H04W 52/24 370/252 |
| 2015/0015720 | A1* | 1/2015 | Kim | A61B 8/00 348/222.1 |
| 2016/0219506 | A1* | 7/2016 | Pratt | H04L 5/143 |
| 2016/0266245 | A1* | 9/2016 | Bharadia | G01S 7/038 |
| 2017/0023663 | A1* | 1/2017 | Subburaj | G01S 7/036 |
| 2018/0113209 | A1* | 4/2018 | Campbell | G01S 17/42 |
| 2020/0099428 | A1* | 3/2020 | Ciochina | H04B 7/0634 |

OTHER PUBLICATIONS

MIT. (Sep. 7, 2017). Circulant matrices. Massachusetts Institute of Technology. https://web.mit.edu/18.06/www/Spring17/Circulant-Matrices.pdf (Year: 2017).*
"Signal Detection for MIMO SC-FDMA Systems Exploiting Block Circulant Channel Structure," in IEEE Transactions on Vehicular Technology, vol. 65, No. 9, pp. 7774-7779, Sep. 2016 (Year: 2016).*
International Search Report corresponding to International Application No. PCT/EP2019/055882, dated Apr. 5, 2019, 5 pages.
Written Opinion corresponding to International Application No. PCT/EP2019/055882, dated Apr. 5, 2019, 5 pages.
T. Aittomaki et al., "Low-Complexity Method For Transmit Beamforming in MIMO Radars", IEEE Proceedings in International Conference on Acoustics, Speech and Signal Processing (ICASSP), 2007, pp. 305-308.
T. Aittomaki et al., "Signal Covariance Matrix Optimization for Transmit Beamforming in MIMO Radars", Asilomar Conference on Signals, Systems and Computers, 2007, pp. 182-186.
D. Fuhrmann et al., "Transmit Beamforming for MIMO Radar Systems using Signal Cross-Correlation", IEEE Trans. on Aerospace and Electronic Systems, vol. 44, No. 1, Jan. 2008, pp. 171-186.
P. Stoica et al., "Synthesis for Diversity-Based Transmit Beampatter Design", IEEE Trans. Signal Process. vol. 56, No. 6, Jun. 2008, pp. 2593-2598.
S. Ahmed et al., "Unconstraint Synthesis of Covariance Matrix for MIMO Radar Transmit Beampattern", IEEE Trans. Signal Process. vol. 59, No. 8, Aug. 2011, pp. 3837-3849.
G. Hua et al., "MIMO Radar Transmit Beampattern Design With Ripple and Transition Band Control", IEEE Trans. Signal Process. vol. 61, No. 11, Jun. 1, 2013, pp. 2963-2974.

T. Yang et al., "Transmit Waveform Synthesis for MIMO Radar Using Spatial-Temporal Decomposition of Correlation Matrix", IEEE Proceedings in Radar Conference, 2014, pp. 1307-1310.
P. Stoica et al., "New Algorithms for Designing Unimodular Sequences With Good Correlation Properties", IEEE Trans. Signal Process. vol. 57, No. 4, Apr. 2009, pp. 1415-1425.
M. Soltanalian et al., "Computational Design of Sequences With Good Correlation Properties", IEEE Trans. Signal Process. vol. 60, No. 5, May 2012, pp. 2180-2193.
P. Stoica et al., "On Probing Signal Design For MIMO Radar", IEEE Trans. Signal Process. vol. 55, No. 8, Aug. 2007, pp. 4151-4161.
M. Soltanalian et al., "Single-stage transmit beamforming design for MIMO radar", IEEE Signal Processing Letters, 2014, pp. 132-138.
M. Soltanalian et al., "Designing Unimodular Codes Via Quadratic Optimization", IEEE Trans. Signal Process. vol. 62, No. 5, Mar. 1, 2014, pp. 1221-1234.
M. Soltanalian et al., "Joint Design of the Receive Filter and Transmit Sequence for Active Sensing", IEEE Signal Processing Letters vol. 20, No. 5, May 2013, pp. 423-426.
J.Li et al., "Signal Synthesis and Receiver Design for MIMO Radar Imaging", IEEE Trans. Signal Process., vol. 56, No. 8, Aug. 2008, pp. 3959-3968.
J. Yang et al., Phase Modulation Tequnique for FourDimensional Arrays, IEEE Antennas and Wireless Propagation Letters vol. 13, 2014, pp. 1393-1396.
P. Rocca et al., "Adaptive Nulling in Time-Varying Scenarios Through Time-Modulated Linear Arrays", IEEE Antennas and Wireless Propagation Letters vol. 11, 2012, pp. 101-104.
Y. Tong et al., "A Two-Channel Time Modulated Linear Array With Adaptive Beamforming", IEEE Transactions on Antennas and Propagation vol. 60, No. 1, Jan. 2012, pp. 141-147.
J. Guo et al., "A Study on Linear Frequency Modulation Signal Transmission by 4-D Antenna Arrays", IEEE Transactions on Antennas and Propagation vol. 63, No. 12, Dec. 2015, pp. 5409-5416.
D. Bliss et al., "MIMO Radar: Resolution, Performance, and Waveforms," in Proceedings of ASAP, 2006, 22 pages.
Z. Yang et al., "Vandermonde Decomposition of Multilevel Toeplitz Marices With Application to Multidimensional Super-Resolution", IEEE Transactions on Information Theory vol. 62, No. 6, Jun. 2016, pp. 3685-3701.
R. Gray Toeplitz, "Circulant Matrices: A review, Deptartment of Electrical Engineering Stanford University", 2020, 98 pages.
M. B. Kilani et al., "Cognitive Waveform and Receiver Selection Mechanism for Multistatic Radar", IET Radar, Sonar and Navigation, 2015, pp. 417-425.
Hammes Christian et al., "Random Phase Center Motion Technique for Enhanced Angle-Doppler Discrimination Using MIMO Radars", 25th European Signal Processing Conference (EUSIPCO), Aug. 28, 2017, pp. 2221-2225.
Yong-Chao Wang et al., "Non the Design of Constant Modulus Probing Signals for MIMO Radarn" IEEE Trans. Signal Process vol. 60, No. 8, Aug. 1, 2012, pp. 4432-4438.
Benjamin Friedlander, "Non Transmit Beamforming for MIMO Radarn", IEEE Trans. on Aerospace and Electronic Systems vol. 48, No. 4, Oct. 1, 2012, pp. 3376-3388.
Hammes Christian et al., "Block Circulant Decomposition of Cross-Correlation Matrix for Transmit MIMO Beamformingn", IEEE 10th Sensor Array and Multichannel Signal Processing Workshop (SAM), Jul. 8, 2018, pp. 597-601.
Ahmed Sajid et al., "A Survey of Correlated Waveform Design Formultifunction Software Radarn", IEEE Aerospace and Electronic Systemsmagazine vol. 31, No. 3, Mar. 1, 2016, pp. 19-31.

* cited by examiner

METHOD AND SYSTEM FOR TARGET DETECTION USING MIMO RADAR

TECHNICAL FIELD

The present invention generally relates to target detection using multiple input, multiple output (MIMO) radar, e.g. for use in automotive applications, and more particularly to a method and system for target detection using block circulant decomposition of cross-correlation matrix for transmit MIMO adaptive beamforming.

BACKGROUND

In order to gain a maximum information (e.g. through multiple input, multiple output, MIMO) about the scene around the vehicle, future automotive radar systems will operate with numerous devices (transceivers) spread over the vehicle and/or that are co-located. In order to be able to process different signals, a form of orthogonality of the different codes transmitted by the transceivers is necessary. This can for instance be achieved by switching on and off the particular devices (time multiplexing).

In the following, prior publications listed at the end of this document ("References") are referred to by number in square brackets ([x]).

The design of a probing signal in a Multiple-Input-Multiple-Output (MIMO) configuration is still an open topic and extensively discussed in literature [1]-[14]. A special challenge is the design of a desired auto-correlation beam pattern, while keeping good cross-correlation beam pattern properties [10]. The beam pattern investigation is based on the covariance matrix of the transmitted probing signals. Therefore, the authors in [1]-[7], [10] consider a two stage design, where the first stage is the optimization of the covariance matrix and the second stage is the determination of the probing signals, which satisfy the covariance structure of stage one. Only in [11], the probing signal is determined by a one stage optimization.

The approaches in literature with regards to finding an optimal solution for a given desired radiation pattern are very diverse, but all of the authors [1]-[7] have the objective of designing probing signals under certain constrains with low computational complexity. The works [3] and [6] are motivated by the design of Finite Impulse Response (FIR) filters and transfer parameters like transition band and or ripple height towards the beam pattern design. The authors in [2] relax the optimization problem in a least square problem, which is easier to solve than the original one. Another approach of enhancing the computational complexity is the analytical evaluation of an integral like objective function [1]. In [7] the correlation matrix is decomposed in a spatial and temporal division matrix, while maintaining good auto- and cross-correlation properties of the probing signal. Very often, the objective function is quartic with regards to the probing signal. A cyclic algorithm for solving such quartic problems under constant modulus and low peak to average ratio constraint is proposed in [4].

A constant modulus constraint is found quite often in literature [3], [4] and [7]. Solving a quartic optimization problem under constant modulus constraint is treated in [8]-[12]. The diversity of different algorithms shows the complexity of such kind of optimization problems.

The authors in [15]-[18] investigate the beam pattern optimization problem more from an antenna group factor perspective, rather than a signal point of view. The major difference lies in the investigation of radio frequency switches or multiplexers leading to on/off modulation, which is different from constant modulus sequences. Further, discrete phase modulation is also included in [15], leading to a difficult optimization problem which is solved with a differential evolution algorithm.

It can be summarized that the computational complexity is one of the biggest issues in adaptive beam pattern design. The computational complexity is mainly justified in quartic optimization problems with subject to a finite alphabet constraint. With regards to a MIMO configuration, low cross-correlation beam pattern is crucial when a good target discrimination is desired [10]. The contributions of this work are the following:

- linear system model for inter pulse modulation,
- deterministic and therefore real time capable algorithm with no iterations by exploiting the Fourier transform like property of ULAs,
- low cross-correlation beam pattern characteristic by proposing a block circulant probing signal matrix,
- a solution for an optimization problem under the constraint of two Quadrature Phase Shift Keying (QPSK) channels in transmit ULA configuration with arbitrary amount of antennas.

SUMMARY

A problem addressed by the present invention is how to provide an effective target detection method and system that employ a deterministic and therefore real time capable algorithm with no iterations by exploiting, exhibit a low cross-correlation beam pattern characteristic and provide a solution for an optimization problem under the constraint of two Quadrature Phase Shift Keying (QPSK) channels which are further multiplexed by $N_T$ transmit antennas.

More particularly, a main drawback of the state of the art adaptive beamforming techniques is the computational complexity for long signals. Further, due to the iterative minimization of the objective function, convergence time and convergence to a local minimum is always an issue. The state of the art literature does not discuss the practical constraint of multiplexed array operation leading to zero norm constraints within the optimization. In general, the optimization problem has a quartic structure under finite alphabet constraints. Finally, enabling a virtual MIMO configuration, while having beamforming capability, is not discussed in literature.

In order to overcome the abovementioned problems, the present invention provides a method of sensing a target in a target detection system comprising processing circuitry and a multiplexer coupled to the processing circuitry and to a plurality $N_T$ of transmit antennas forming a sparse transmit uniform linear array (ULA), the multiplexer being configured to generate multiplexed and phase modulated transmit signals $(T_1 \ldots T_{N_T})$ based on signals from a local oscillator, the processing circuitry being further coupled for receiving signals via a plurality $N_R$ of receive antennas forming a dense receive ULA, the method comprising: transmitting the plurality of transmit signals via the transmit antennas so as to form a general radiation pattern corresponding to a block circulant probing signal matrix; receiving via the receive antennas receive signals resulting from backscattering of the plurality of transmit signals transmitted towards K targets; and processing the received reflection signals to determine the presence, range and/or angular position of a target within a field of view of the transmit antennas.

In at least some embodiments, the method involves a signal design procedure in a virtual MIMO configuration.

The exploration of uniform linear array (ULA) structure leads to a block circulant signal matrix design. The restriction to a block circulant signal matrix is beneficial in two ways. Firstly, the eigenvector matrix structure of the related signal covariance matrix has always the Discrete Fourier Transform (DFT) structure, which matches to the transmit steering matrix. This in hand ensures good target discrimination and results in almost the same resolution characteristics as perfectly orthogonal signals. Secondly, the circulant structure lowers the degrees of freedom leading to a closed form solution for obtaining a desired radiation pattern.

In embodiments, the closed form solution comprises an inverse DFT approach, further constraints on the transmitted signal, such as Quadrature Phase Shift Keying in a two-channel multiplexed configuration, leads to mapping of the inverse DFT operation and the transmitted signal matrix. This mapping enables the implementation of a non-iterative approach for obtaining a desired radiation pattern, while having good target discrimination properties.

Preferably, the block circulant probing signal matrix $P(\phi_N, \phi_M)$ is given by $$P(\phi_K, \phi_M) = \left| \sum_{n=1}^{N_T} \lambda_n \mathrm{sinc}_d\left(\frac{N_T}{2}\left(k_0 d_T \sin(\phi_K) - n\frac{2\pi}{N_T}\right)\right) \times \mathrm{sinc}_d\left(\frac{N_T}{2}\left(k_0 d_T \sin(\phi_M) - n\frac{2\pi}{N_T}\right)\right) \right|^2$$

where the discrete sinus cardinal function is defined as $$\mathrm{sinc}_d\left(\frac{N_T}{2}x\right) = \frac{\sin\left(\frac{N_T}{2}x\right)}{\sin\left(\frac{1}{2}x\right)}$$

and $\lambda_n$ represents the n-th eigenvalue of a covariance matrix $R_s$, $$k_0 = \frac{2\pi}{\lambda}$$

is the tree space wavenumber and $\phi_K$ defines the K-th target angle of arrival.

Preferably, the block circulant probing signal matrix S is given by $$\tilde{S} = (\tilde{s}_1 \ldots \tilde{s}_{i_c} \ldots \tilde{s}_{I_c}) = (B_1 \ldots B_b \ldots B_{N_B})$$

where each block circulant matrix $B_b \in \mathbb{C}^{N_T \times N_T}$ is parametrized by a single column vector $c_b \in \mathbb{C}^{N_T \times 1}$ Preferably, the method further comprises generating Quadrature Phase Shift Keyed (QPSK) signals based on pulse signals from the local oscillator.

Preferably, the method further comprises multiplexing with the multiplexor the QPSK signals over a plurality of transmit channels, for transmission via the transmit antennas.

Preferably, the number of transmit channels is two.

The method preferably further includes performing beam pattern adaptation to generate an adapted radiation pattern corresponding to an adapted block circulant probing signal matrix. Preferably, the beam pattern adaptation is performed in a single execution of an adaptation procedure.

Preferably, performing beam pattern adaptation includes determining an overall auto-correlation function as a superposition of Na block matrix vector auto-correlation function $r(\tau) = \sum_{b=1}^{N_b} r_{c_b}(\tau)$, where $r_{c_b}(\tau) = \sum_{\gamma=1}^{N_T} [c_b]_{\gamma+\tau} [c_b^H]_\gamma$ is a block matrix vector auto-correlation function, r is a relative shift between vector elements, $N_T$ is the number of transmit antennas and $c_b$ is a column vector which parametrizes the b-th block circulant matrix.

Preferably, performing beam pattern adaptation includes initializing desired beam pattern $P_d(\phi)$ to a prior beam pattern from a prior target detection, or else if there is no prior beam pattern from a prior target detection the desired beam pattern is set as a constant or isotropic.

The method preferably further comprises generating a Fourier series approximation of desired beam pattern $P_d(\phi)$, the Fourier series approximation including Fourier coefficients.

The method preferably further comprises discretizing the Fourier coefficients to $N_B$ basis functions.

The method preferably further comprises mapping the discrete Fourier coefficients to an adapted block circulant probing signal matrix using the $N_B$ basis functions.

The method preferably further comprises applying target detection using a matched filter output threshold repeating the operation—performing beam pattern adaptation includes initializing desired beam pattern $P_d(\phi)$ to a prior beam pattern from a prior target detection, or else if there is no prior beam pattern from a prior target detection the desired beam pattern is set as a constant on the basis of the target detection applied.

According to another aspect of the invention there is provided a detection system for sensing a target, the system comprising: a multiplexer coupled to a plurality $N_T$ of transmit antennas forming a sparse transmit uniform linear array (ULA), a plurality $N_R$ of receive antennas forming a dense receive ULA, the multiplexer being configured to generate multiplexed transmit signals $(T_1 \ldots T_{NT})$ based on signals from a local oscillator; and processing circuitry, the processing circuitry being coupled to the multiplexer, the transmit antennas and the receive antennas and being configured to perform the method of any of the appended claims.

According to another aspect of the invention there is provided a vehicle comprising a detection system according to claim 13 of the appended claims.

The invention relates to the design of novel waveforms to achieve orthogonality in the emerging Multiple-Input-Multi-Output (M IMO) Radar paradigm.

Advantages of the invention, at least in some embodiments, include the following: the designed waveforms can be used to enhance resolution of targets in the angular domain (azimuth and elevation) and Doppler domain as well as interference mitigation in co-existence scenarios. Further, the beamforming capability has the advantage of suppressing clutter and enhancing the signal to clutter to noise ratio.

In addition, the invention, at least in some embodiments, has the following advantages:
 a deterministic computational complexity leading to real time performance,
 the block circulant signal matrix structure enables nearly full resolution capability of a virtual MIMO, while having the capability of beamforming, and
 the technique can in principal be extended to other waveforms, like PMCW or OFDM.

In at least some embodiments, for the automotive industry, the invention may enhance the comfort and safety applications as well as wide-spread deployment of automotive radars without significant interference. In some embodiments, it may also provide for the use of radar in a cognitive mode in spectrum sharing scenarios which further enhances the attractiveness of the deployment.

BRIEF DESCRIPTION OF THE DRAWINGS

Further details and advantages of the present invention will be apparent from the following detailed description of not limiting embodiments with reference to the attached drawing, wherein.

DETAILED DESCRIPTION

I. Introduction

Figure 1:
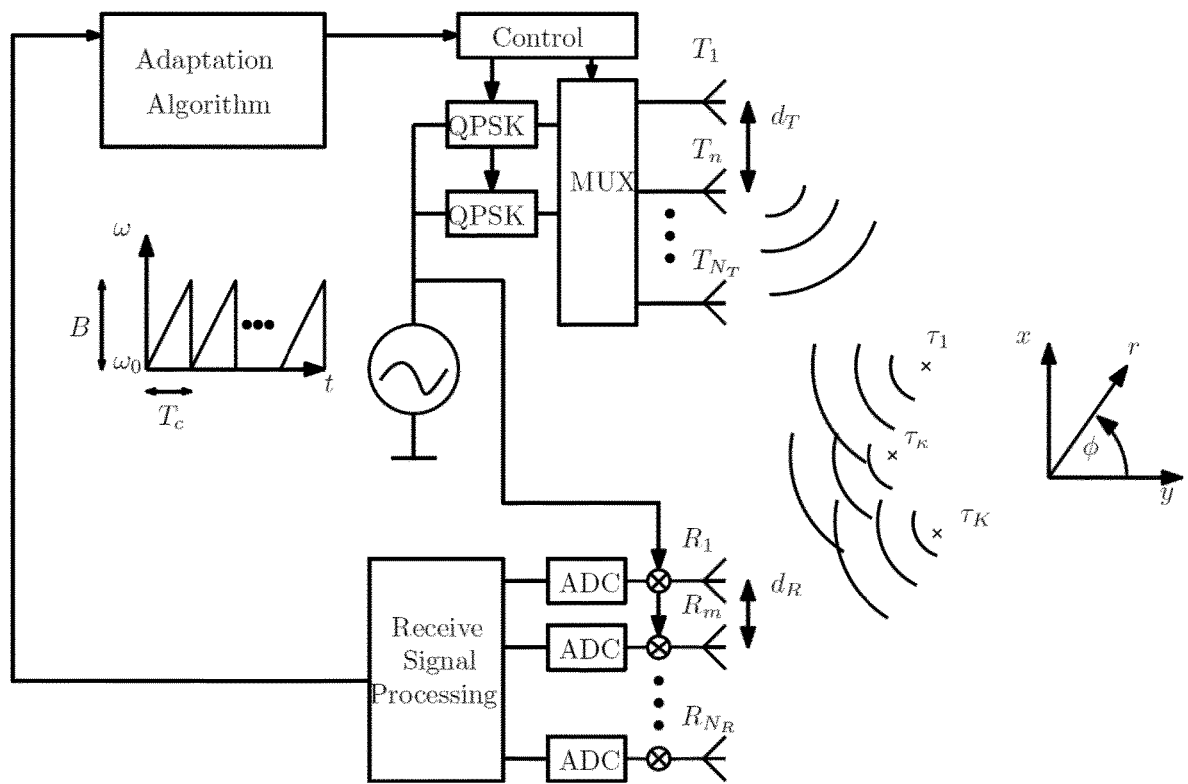
FIG. 1 schematically illustrates the hardware system according to an embodiment of the invention.

In the following, like numerals will be used to indicate like elements. Unless indicated otherwise, any hardware element, algorithmic step or operation described herein (e.g. in relation to one embodiment) may be employed in conjunction with one, more or all other hardware elements, algorithmic steps or operations described herein (e.g. in relation to another embodiment).

While the present invention is described in the context of RADAR system design for automotive applications, the techniques described herein can be applied in any suitable system in automotive, security and spectrum sharing (with other RADAR systems/communication systems) scenarios.

In this disclosure the operator $\|\cdot\|_p$ defines the $l_p$-norm. A matrix entry is defined by $[\cdot]_{\eta,\gamma}$, where $\eta$ denotes the row index and $\gamma$ the column index. A vector entry $[\cdot]_\eta$ is defined by one index $\eta$. The E $\{\cdot\}$ denotes the expectation operator. The set of complex numbers is defined as C, while $j=\sqrt{-1}$ represents the complex number. The Kronecker product is defined as $\otimes$.

II. System Model

In an embodiment, the underlying system comprises one local oscillator, generating a train of $I_c$ Frequency Modulated Continuous Wave (FMCW) pulses. Each pulse has a duration of $T_c$, bandwidth B with the center frequency $$f_0 = \frac{\omega_0}{2\pi}.$$

This train of FMCW pulses is further processed by the transmit modulation unit. This unit comprises $N_c$ parallel QPSK modulators capable of imparting four phase shifts $$\left(0, \pm\frac{\pi}{2}, \pi\right).$$

The $N_c$ modulated channels are further multiplexed between the $N_T$ transmit antennas. It has to be noted that the number of channels is less than the number of transmit antennas, leading to $N_c < N_T$.

In an embodiment, the sparse transmit Uniform Linear Array (ULA), with an antenna inter-element spacing of $d_T$, transmits the modulated signals towards K distinct targets. The back scattered signal from K targets are superposing in space and are captured by the $N_R$ receive antennas. The $N_R$ receive antennas are further mounted as a ULA with an inter-element spacing of $$d_R = \frac{\lambda}{2}.$$

This configuration leads to a Multiple-Input-Multiple-Output (MIMO) antenna configuration, with a sparse transmit $d_T = N_R d_R$ and dense receive ULA, leading to an investigation of virtual MIMO array.

In an embodiment, after receiving, the $N_R$ different receive signals are mixed down and converted to the digital domain using Analog to Digital Converter (ADC). The receive signal processing is done by matched filtering with a subsequent thresholding for target detection and extraction of the scenario information. This information can be further used to adapt the transmitted signal. In an embodiment, the closed loop system structure leads to adaptive waveform design, which is further described in Section III.

A. Transmitted Signal

As the receiver has access to sampled waveforms, a discrete time representation of the transmitted signal is considered. Each FMCW pulse $p \in \mathbb{C}^{I_s \times 1}$ iis therefore sampled with the sampling time $T_s$ with a total number of $I_s$ samples. The $i_s$-th entry of the pulse vector p is defined as, $$[p]_{i_s} = \exp\left(j\left(\omega_0 T_s i_s + \frac{B}{2T_c}(T_s i_s)^2\right)\right) \quad (1)$$

The angular frequency $\omega_0 = 2\pi f_0$ is proportional to the center frequency. Another reasonable assumption is that the phase modulation units, as well as the multiplexing, are operating much slower than the sampling time $T_s$, such that the transmit modulation is done across pulses, leading to an inter pulse modulation. For each FMCW pulse, $N_T$ transmit antennas need to be modulated, leading to the signal modulation vector $s \in \mathbb{C}^{I_c N_T \times 1}$ The multiplexing restricts the signal modulation vector s to $N_c I_c$ nonzero entries. In addition to the zero entries, s is restricted to a QPSK modulation, leading to $s \in \Omega_0^{I_c N_T \times}$, where the set $\Omega_0 = \{0\} \cup \Omega$ comprises the zero to model the multiplexing, and $\Omega = \{1, -1, j, -j\}$ represents the fourth root of the complex unit circle due to the QPSK modulation. The transmit signal vector $x \in \mathbb{C}^{I_s I_T \times 1}$ comprises the signal modulation vector and the pulse vector, $$x = s \lfloor p \quad (2)$$

B. System Transfer Function and Received Signal

Due to the inter pulse modulation, and assuming the propagation delay is much smaller than the pulse duration $T_c$, the propagation delay just influences the pulse vector. Further, the pulse vector is completely separable from the signal modulation vector, as induced by the Kronecker product in (2). The down mixed and digitized pulse vector for the κ-th target $\hat{p}_\kappa \in \mathbb{C}^{I_s \times 1}$ is defined as, $$[\hat{p}_\kappa]_{i_s} = c_\kappa \exp(j(\omega_{D_K} T_s i_s + \omega_{B_K} i_s T_s)) \quad (3)$$

The complex constant $$c_\kappa = \exp\left(j(\omega_0 - \omega_{D_K})t_\kappa + j\frac{B}{2T_c}t_\kappa^2\right)$$

is a result of FMCW down mixing, where the propagation delay of the K-th target is denoted by $$t_\kappa = \frac{2r_\kappa}{c_0}$$

with the K-tri target range r, and the speed of light in free space $c_0$. Further, the range information is induced in the beat frequency $$\omega_{B_K} = 2\frac{B}{T_c}\frac{r_\kappa}{c_0},$$

whereas the κ-th target Doppler shift is described by $\omega_{D_\kappa}$. The overall received signal can be written as, $$\hat{y} = \sum_{\kappa=1}^{K}(H_\kappa s) \otimes \hat{p}_\kappa \quad (4)$$

The matrix $H_\kappa$ includes the MIMO channel characteristic for the κ-th target, the diagonal Doppler shift matrix $$D_{\omega_{D_K}}$$

and the attenuation factor $\alpha_\kappa$, comprising target Radar Cross Section (RCS), path loss and the attenuation due to target range. Therefore, K-th target channel matrix can be written as, $$H_\kappa = \alpha_\kappa (a_{R_K} a_{T_K}^H) \otimes D_{\omega_{D_K}} \quad (5)$$

where the receive steering vector with the antenna index m is defined as, $$[a_{R_\kappa}]_m = \exp(jk_0 \sin(\phi_\kappa) d_R m) \quad (6)$$

The free space wavenumber is defined as $$k_0 = \frac{2\pi}{\lambda}$$

and $\phi_\kappa$ defines the κ-th target angle of arrival. In accordance to the ULA assumption, the transmit steering vector with the antenna index n is defined as, $$[a_{T_\kappa}]_n = \exp(jk_0 \sin(\phi_\kappa) d_T n) \quad (7)$$

The Doppler information is mathematically separable in the system model, therefore, the Doppler matrix can be modeled as diagonal, $$D_{\omega_{D_K}} = \mathrm{diag}(\exp(j\omega_{DK}T_c1), \ldots, (j\omega_{DK}T_cI_c)) \quad (8)$$

As the range information can be completely separated from the angle-Doppler information, and the techniques discussed hereinafter focus on beam pattern design, it is sufficient to consider just the system model with the signal modulation vector, $$y = \sum_{\kappa=1}^{K} H_\kappa s \quad (9)$$

C. Matched Filter

The receive signal processing comprises a matched filter whose coefficients take the form $y_M = H_M s$. The matched filter coefficients do not include any RCS information and are parametrized by angle $\phi_M$ and Doppler shift $\omega_{DM}$.

$$H_M(a_{RM} a_{TM}^H) \otimes D_{\omega_{DM}} \quad (10)$$

Due to the inter pulse modulation scheme, it is a reasonable assumption to model the κ-th attenuation factor $\alpha_\kappa$ as a Swerling one model, where each target RCS fluctuates across pulses and has to be considered as statistical parameters [22]. In order to get an estimate of the matched filter output, the expected value of the squared matched filter output is investigated, $$E\{|y_M^H y|^2\} = E\left\{\left|\sum_{\kappa=1}^{K} s^H H_M^H H_\kappa s\right|^2\right\} \quad (11)$$

The block diagonal structure of $H_M$ yields to a sum over $I_c$ pulses, where the pulse index is denoted by $i_c$. Further, it can be assumed that RCS fluctuations, due to the Swerling one model, are statistically independent from each other, leading to the following matched filter output expression, $$E\{|y_M^H y|^2\} = \sum_{\kappa=1}^{K} \sigma_\kappa^2 |a_{RM}^H a_{R\kappa}|^2 \left|a_{TM}^H \left(\sum_{i_c=1}^{I_c} \tilde{s}_{i_c} \tilde{s}_{i_c}^H \exp(-j(\omega_{DM} - \omega_{D\kappa})T_c i_c)\right) a_{T\kappa}\right|^2 \quad (12)$$

The attenuation factor variance for the κ-th target is defined as $\sigma_\kappa$. The transmit antenna modulation vector for the $i_c$-th pulse is denoted as $\tilde{s}_{i_c} \in \Omega_0^{N_T \times 1}$. In the following investigations, Doppler influence is neglected, as its investigation is outside the scope of this disclosure. Under the zero Doppler assumption, the following equation describes cross-correlation beam pattern, $$P(\phi_\kappa, \phi_M) = \left|a_{TM}^H \left(\sum_{i_c=1}^{I_c} \tilde{s}_{i_c} \tilde{s}_{i_c}^H\right) a_{T\kappa}\right| \quad (13)$$

For $\phi_\kappa = \phi_M$, (13) represents the transmitted auto-correlation beam pattern. If the covariance matrix of the transmitted signal $R_s \in \mathbb{C}^{N_T \times N_T}$ is defined as, $$R_s = \sum_{i_c=1}^{I_c} \tilde{s}_{i_c} \tilde{s}_{i_c}^H = \tilde{S}\tilde{S}^H \qquad (14)$$

the probing signal matrix $\tilde{S} \in \mathbb{C}^{N_T \times I_c}$ is defined as, $$\tilde{S} = (\tilde{s}_1 \ldots \tilde{s}_{i_c} \ldots \tilde{s}_{I_c}) \qquad (15)$$

Based on the derivation of this section, an optimization criterion can be defined in the following.

III. Beam Pattern Optimization and Adaptation

As derived in Section II, the matched filter output takes the form of a two dimensional radiation pattern, where the actual target position $\phi_\kappa$ is mapped to the matched filter output $\phi_M$. The matched filter operates optimally if the actual target position appears at the matched filter output as a Dirac impulse, leading to the desired radiation pattern $P_d(\phi_\kappa, \phi_M)$, $$P_d(\phi_\kappa, \phi_M) = f(x) = \begin{cases} P_d(\phi) & \phi_\kappa = \phi_M \\ 0, & \text{else} \end{cases} \qquad (16)$$

The formulation above means, the auto-correlation beam pattern is desired to have an arbitrary form of $P_d(\phi)$, while the cross-correlation beam pattern is supposed to be zero, namely the matched filter output is not disturbed by any clutter. If the desired radiation pattern $P_d(\phi_\kappa, \phi_M)$ is uniformly sampled in both dimensions $\phi_\kappa$ and $\phi_M$ with a total sample number of $N_\kappa$ for the $\phi_\kappa$ dimension and $N_M$ for the $\phi_M$ dimension the desired radiation pattern can be written in matrix notation $P_d \in \mathbb{R}^{N_M \times N_\kappa}$. Further, as the desired cross-correlation beam pattern is sampled, the transmit steering vector within the matched filter $a_{TM}$ and the target transmit steering vector $a_{T\kappa}$ have to be sampled as well, leading to matched filter transmit steering matric $$A_{TM} = (a_{TM_1} \ldots a_{TM_{N_M}})^T \in \mathbb{C}^{N_M \times N_T}$$

and a target transmit steering matrix $$A_{T\kappa} = (a_{T\kappa_1} \ldots a_{T\kappa_{N_\kappa}})^T \in \mathbb{C}^{N_\kappa \times N_T}.$$

Therefore, the signal design problem can be formulated as follows, $$\min_{N_T \times I_c} \|P_d - A_{TM}^H R_s A_{T\kappa}\|_F^2 \qquad (17)$$

$$\text{s.t. } \|\tilde{s}_{i_c}\| = N_c$$

The zero norm, as a constraint, represents the multiplexing of $N_c=2$ towards $N_T$ antennas. Further, the probing signal matrix is constraint to a finite alphabet $\Omega_0$. The optimization problem is in general hard to solve. In order to overcome the difficulties in the solution, the ULA assumption is exploited towards providing a simple, albeit sub-optimal, framework for designing $\hat{s}$ to enhance the cross-correlation beam pattern.

A. Block Circulant Property and Target Discrimination

The assumption of a transmit ULA yields a Vandermonde matrix for $A_{TM}$ and $A_{T\kappa}$. If the covariance matrix $R_s$ has Toeplitz structure, a Vandermonde decomposition can be applied, leading to a Vandermonde-Diagonal-Vandermonde matrix structure [20]. Further, if the covariance matrix is circulant Hermitian matrix, the aforementioned decomposition is, in fact, the eigenvalue decomposition with the columns of Discrete Fourier Transform (DFT) matrix being the eigenvectors of $R_s$ [21]. A circulant Hermitian matrix can be constructed by using a block circulant probing signal matrix, $$\tilde{S} = (\tilde{s}_1 \ldots \tilde{s}_{i_c} \ldots \tilde{s}_{I_c}) = (B_1 \ldots B_b \ldots B_{N_B}) \qquad (18)$$

Each block circulant matrix $B_b \in \mathbb{C}^{N_T \times N_T}$ can be parametrized by a single vector $c_b \in \mathbb{C}^{N_T \times 1}$ [21] The advantage of restricting the covariance matrix to be circulant instead of just Toeplitz is that the eigenvector matrix $D = (d_1 \ldots d_n \ldots d_{N_T}) \in \mathbb{C}^{N_T \times N_T}$ is a DFT matrix with the eigenvectors $d_n$, which is orthonormal, $$R_s = \sum_{b=1}^{N_B} B_b B_b^H = D\left(\sum_{b=1}^{N_B} \Psi_b \Psi_b^H\right) D^H = D\Lambda D^H \qquad (19)$$

The orthonormal property of the DFT matrix yields a covariance matrix with a DFT eigenvector matrix. The diagonal eigenvalue matrix of the covariance matrix $\Lambda \in \mathbb{R}^{N_T \times N_T}$ is a squared sum over all eigenvalue matrices $\Psi_b \in \mathbb{C}^{N_T \times N_T}$ of the block circulant probing signal matrix. The general radiation pattern for any block circulant probing signal matrix leads to the following, $$\begin{aligned}
P(\phi_\kappa, \phi_M) &= |a_{TM}^H D\Lambda D^H a_{T\kappa}|^2 \\
&= \left|\sum_{n=1}^{N_T} \lambda_n a_{TM}^H d_n (a_{T\kappa}^H d_n)^H\right|^2 \\
&= \left|\sum_{n=1}^{N_T} \lambda_n \text{sinc}_d\left(\frac{N_T}{2}\left(k_0 d_T \sin(\phi_\kappa) - n\frac{2\pi}{N_T}\right)\right) \times \right. \\
&\quad \left. \text{sinc}_d\left(\frac{N_T}{2}\left(k_0 d_T \sin(\phi_M) - n\frac{2\pi}{N_T}\right)\right)\right|^2.
\end{aligned} \qquad (20)$$

where the discrete sinus cardinal function is defined as $$\text{sinc}_d\left(\frac{N_T}{2}x\right) = \frac{\sin\left(\frac{N_T}{2}x\right)}{\sin\left(\frac{1}{2}x\right)}$$

and $\lambda_n$ represents the n-th eigenvalue of $R_s$. It is stated in [19] that the maximum resolution for equal antenna element power constraint in an virtual MIMO configuration is achieved when the transmitted signals are perfectly orthogonal, leading to diagonal covariance matrix, $$\begin{aligned}
P_{ort}(\phi_k, \phi_M) &= |a_{TM}^H R_s a_{T\kappa}|^2 \\
&= \left|tr(R_{\tilde{s}})\text{sinc}_d\left(\frac{N_T}{2}k_0 d_T(\sin(\phi_M) - \sin(\phi_\kappa))\right)\right|^2
\end{aligned} \qquad (21)$$

As in (21) the physical resolution limit of the presented structure is shown, it is of interest how the techniques in (20) according to an embodiment of the invention perform in relation to (21). This result is further discussed through simulations.

B. Probing Signal Generation and Beam Pattern Adaptation

As a result of the previous section, the cross-correlation beam pattern is addressed by applying a block circulant property to the probing signal matrix and its eigenvector structure. The auto-correlation property on the other hand lies within the eigenvalues, which can be proved by setting $\phi_M = \phi_k$ in (20), $$\lambda_n = \sum_{b=1}^{N_B} \psi_{nb}\psi_{nb}^H = \sum_{b=1}^{B} |\psi_{nb}|^2 = \sum_{b=1}^{N_B} \left|\sum_{p=1}^{N_T} [c_b]_p \exp\left(j\frac{2\pi}{N_T}pn\right)\right|^2 = \quad (22)$$

$$\sum_{b=1}^{N_B} \sum_{p_1=1}^{N_T} \sum_{p_2=1}^{N_T} [c_b]_{p_1} [c_b^H]_{p_2} \exp\left(j\frac{2\pi}{N_T}(p_1 - p_2)n\right) =$$

$$\sum_{b=1}^{N_B} \sum_{\tau=-N_T}^{N_T} (N_T - |\tau|) r_{c_b}(\tau) \exp\left(j\frac{2\pi}{N_T}\tau n\right)$$

The block matrix vector auto-correlation function is defined as $r_{c_b}(\tau) = \sum_{\gamma=1}^{N_T} [c_b]_{\gamma+\tau} [c_b^H]_\gamma$, where $\tau = p_1 - p_2$ implies the relative shift between the vector elements. The overall auto-correlation function is a superposition of $N_B$ block matrix vector auto-correlation function $r(\tau) = \sum_{b=1}^{N_B} r_{c_b}(\tau)$. Due to the Hermitian property of the covariance matrix, the auto-correlation function satisfies the property $r(\tau) = r^*(-\tau)$. The equation above can be further simplified, $$\lambda_n = 2N_T B + 2\sum_{\tau=1}^{N_T} (N_T - \tau) \left[\Re\{r(\tau)\}\cos\left(\frac{2\pi}{N_T}\tau n\right) - \Im\{r(\tau)\}\sin\left(\frac{2\pi}{N_T}\tau n\right)\right] \quad (23)$$

As remarked in the introduction and within Section II, the transmit array is multiplexed with two channels, leading to $\|c_b\|_0 = 2$. The two channel assumption results in a simple mapping of the entries of $c_b$ and the radiation pattern as shown in Table I.

TABLE I

MAP OF FOURIER COEFFICIENTS TO PROBING SIGNAL

| $[c_b]_{p1}$ | $[c_b]_{p2}$ | $r_b(\tau)$ | $\|\psi_{nb}\|^2$ |
|---|---|---|---|
| 1 | 1 | 1 | $2N_T + 2(N_T - \tau)\cos\left(\frac{2\pi}{N_T}\tau n\right)$ |
| 1 | j | j | $2N_T - 2(N_T - \tau)\sin\left(\frac{2\pi}{N_T}\tau n\right)$ |
| 1 | -j | -j | $2N_T + 2(N_T - \tau)\sin\left(\frac{2\pi}{N_T}\tau n\right)$ |
| 1 | -1 | -1 | $2N_T - 2(N_T - \tau)\cos\left(\frac{2\pi}{N_T}\tau n\right)$ |

The common structure in the last column of Table I is the two plus a sinusoidal function. The constant term (here two) gives the total transmitted power per probing signal block, while the latter sinusoidal term can be seen as an energy shaping, recalling that n is equivalent to the angle for $N_T \to \infty$ of the auto-correlation beam pattern (compare with (20)). Therefore, the auto-correlation beam pattern can be superposed by $N_B$ basis functions, where the frequency of the basis function depends on the relative gap r between the nonzero coefficients within $c_b$. Or in other words, if two collocated transmit antenna elements are excited, the result is the first spatial harmonic $\tau = 1$. If the excited antenna pair has one not excited antenna element in between, the second spatial harmonic $\tau = 2$ is constructed. This goes on until the very left and the very right transmit antenna elements are excited. In this case, the maximum spatial frequency is reached $\tau = N_T - 1$. Therefore, the auto-correlation radiation pattern can be composed by $N_T - 1$ spatial harmonics, leading to a Fourier series approximation of the radiation pattern, where each frequency is related to a certain transmit antenna excitation pair. The related phase for each frequency can be composed of a superposition of sine and cosine functions of the same frequency as illustrated in FIG. 2.

Figure 2:
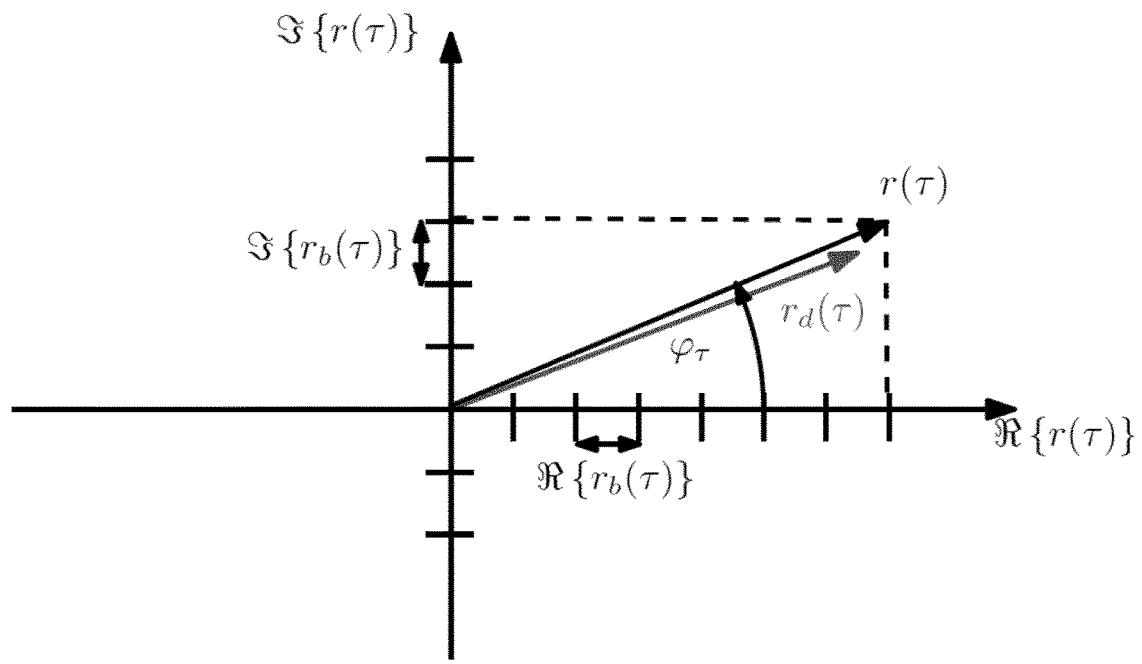
FIG. 2 graphically represents a desired auto-correlation value rd($\tau$) as used in at least some embodiments of the invention composed of a finite number of rb($\tau$)

FIG. 2 graphically represents a desired auto-correlation value $r_d(\tau)$ as used in at least some embodiments of the invention—composed of a finite number of $r_b(\tau)$. The higher the number of circulant blocks $N_B$, the better the approximation of $r_d(\tau)$.

Another important parameter is the amplitude of a particular spatial frequency. If the number of circulant blocks within the probing signal matrix is much bigger than the number of transmit antenna elements $N_B \gg N_T$, all spatial frequency amplitudes are discretized by $N_B$ (see FIG. 2).

If new knowledge is accumulated, the desired radiation pattern can be updated in a loop as shown in Table II.

TABLE II

ADAPTATION ALGORITHM

Step 0: Initializing desired beam pattern $P_d(\phi)$ from knowledge of prior target detection. If there is no prior knowledge the desired beam pattern is constant, leading to orthogonal signals
Step 1: Fourier series approximation of desired beam pattern
Step 2: Discretize the Fourier coefficients to $N_B$ basis functions
Step 3: Map discrete Fourier coefficients to block circulant probing signal matrix.
Step 4: Apply target detection using a matched filter output threshold and go to Step 0 and taking advantage of the new detection.

The signal adaptation is done in a single round, leading to no iteration and therefore no convergence issues. Another aspect of having no iteration is that the computational complexity is deterministic and therefore has the capability of real time processing. Further, if the probing signal length increases, the computational complexity does not increase significantly, because the sequence length is just used to make the amplitude discrete.

IV. Simulation

The simulation is carried out with $N_T = 10$ transmit antennas and $N_R = 4$ receive antennas.

Figure 3:
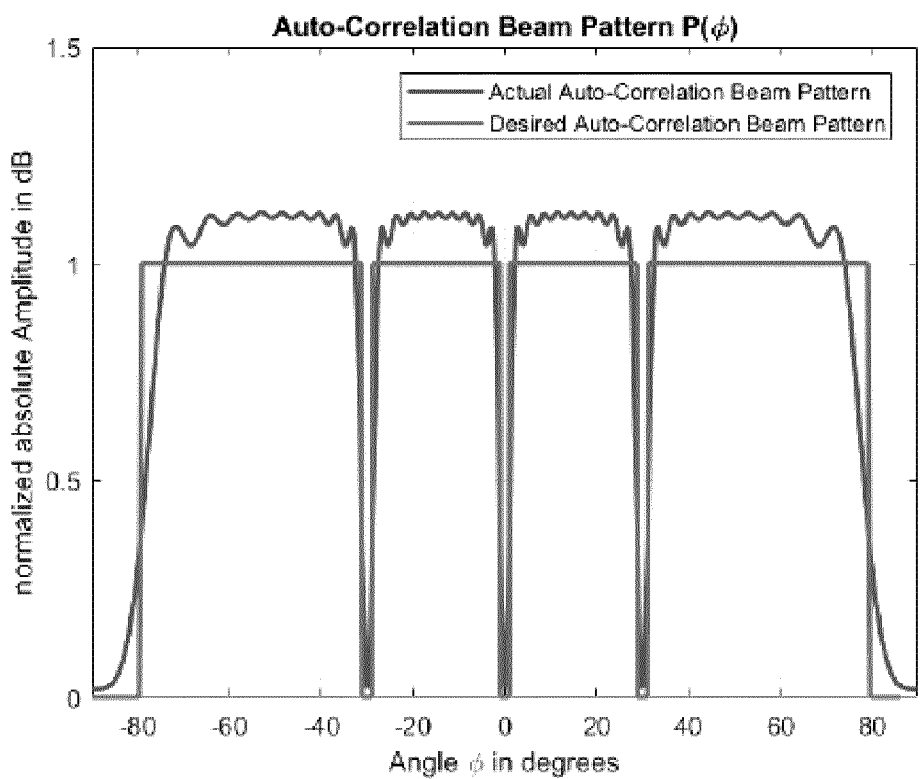
FIG. 3 shows an auto-correlation beam pattern for a desired target suppression at $\phi=0°$, using techniques according to an embodiment of the invention.

FIG. 3 shows an auto-correlation beam pattern for a desired target suppression at $\phi = 0°$, using techniques according to an embodiment of the invention. The periodicity is related to the sparsity of the transmit array $$d_T = N_R \frac{\lambda}{2}.$$

Figure 4:
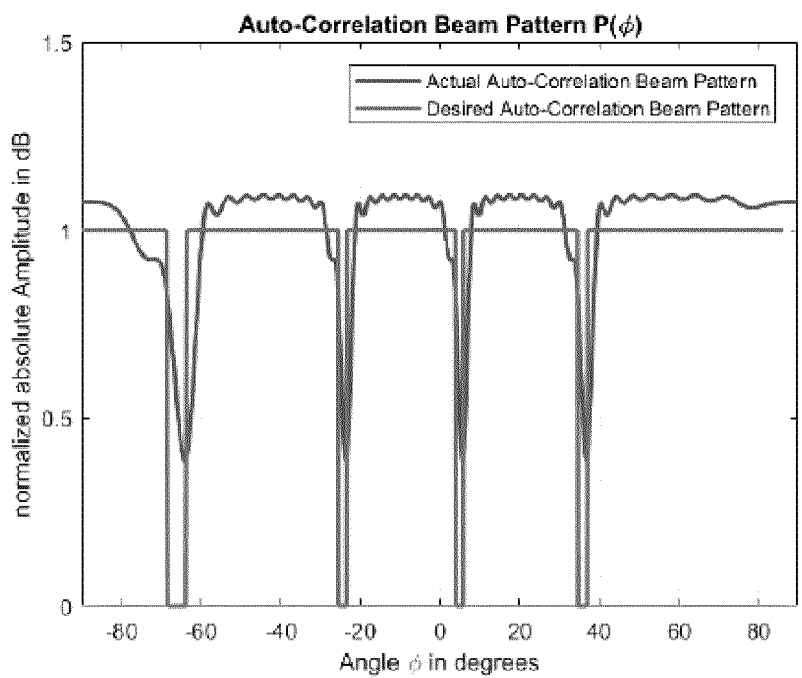
FIG. 4 shows an auto-correlation beam pattern for a desired target suppression at $\phi=5°$, using techniques according to an embodiment of the invention.

FIG. 4 shows an auto-correlation beam pattern for a desired target suppression at ϕ=5°, using techniques according to an embodiment of the invention. The periodicity is related to the sparsity of the transmit array $$d_T = N_R \frac{\lambda}{2},$$

while the offset is related to superposition of squared sine and cosine functions.

Thus, FIGS. 3 and 4 illustrate the feasibility of beam pattern shaping using techniques according to an embodiment of the invention. The difference between FIGS. 3 and 4 is that in FIG. 4 the beam pattern goes not to zero, because the radiation pattern is composed of squared sine and cosine I, due to the two channel QPSK modulation scheme. In order to ensure any arbitrary beamshape, like a null steering at 5° as illustrated in FIG. 4, a mixture of squared sine and cosine functions is necessary, because an arbitrary angle can be only achieved if both functions are present (compare FIG. 2).

Figure 5:
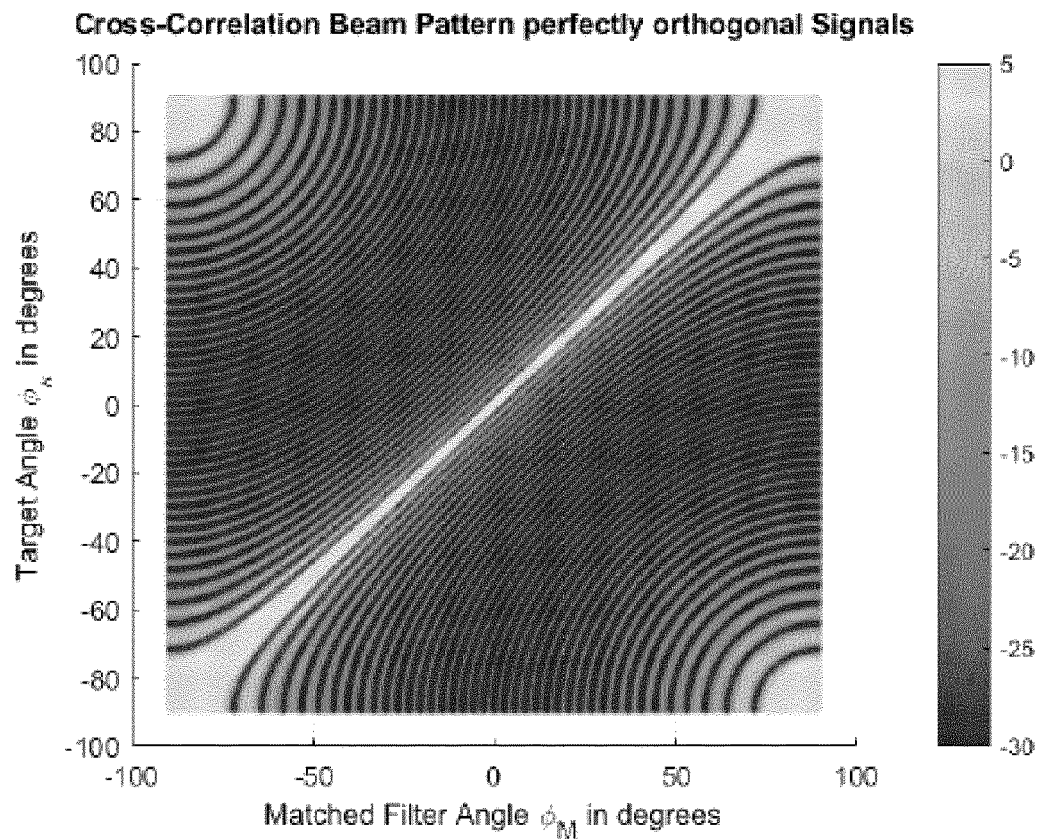
FIG. 5 shows a cross-correlation beam pattern for (perfectly) orthogonal signals Port, for comparison.

FIG. 5 shows a cross-correlation beam pattern for (perfectly) orthogonal signals $P_{ort}$, for comparison. As can be seen, the beam pattern confirms the result of a $sinc_d$-like resolution characteristic.

Figure 6:
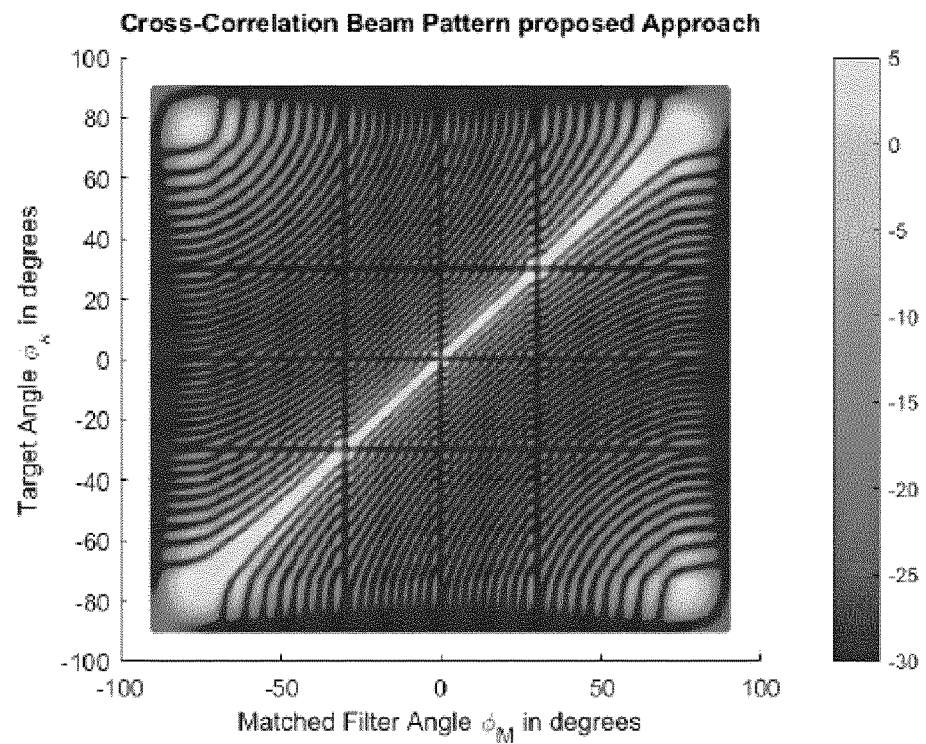
FIG. 6 shows a cross-correlation beam pattern for P($\phi$k, $\phi$M)—using techniques according to another embodiment of the invention.

FIG. 6 shows a cross-correlation beam pattern for $P(\phi_k, \phi_M)$ using techniques according to another embodiment of the invention. As can be seen, the beam pattern confirms the similarity to orthogonal signals. The target resolution degrades a bit near the beam pattern transitions.

The cross-correlation beam pattern 5 illustrates the resolution capability of perfectly orthogonal signals. The cross-correlation beam pattern in FIG. 6 depicts the resolution characteristic for techniques according to an embodiment of the invention. The resolution characteristic is defined by the width of the diagonal line in FIGS. 5 and 6. It can be seen, that the resolution is similar to FIG. 5 with some differences in resolution on the transition band (when the auto-correlation beam pattern goes from low to high level). A cutting plane of FIG. 6 at 5° (similar to a matched filter output for a single target at 5°) is illustrated in FIG. 7.

Figure 7:
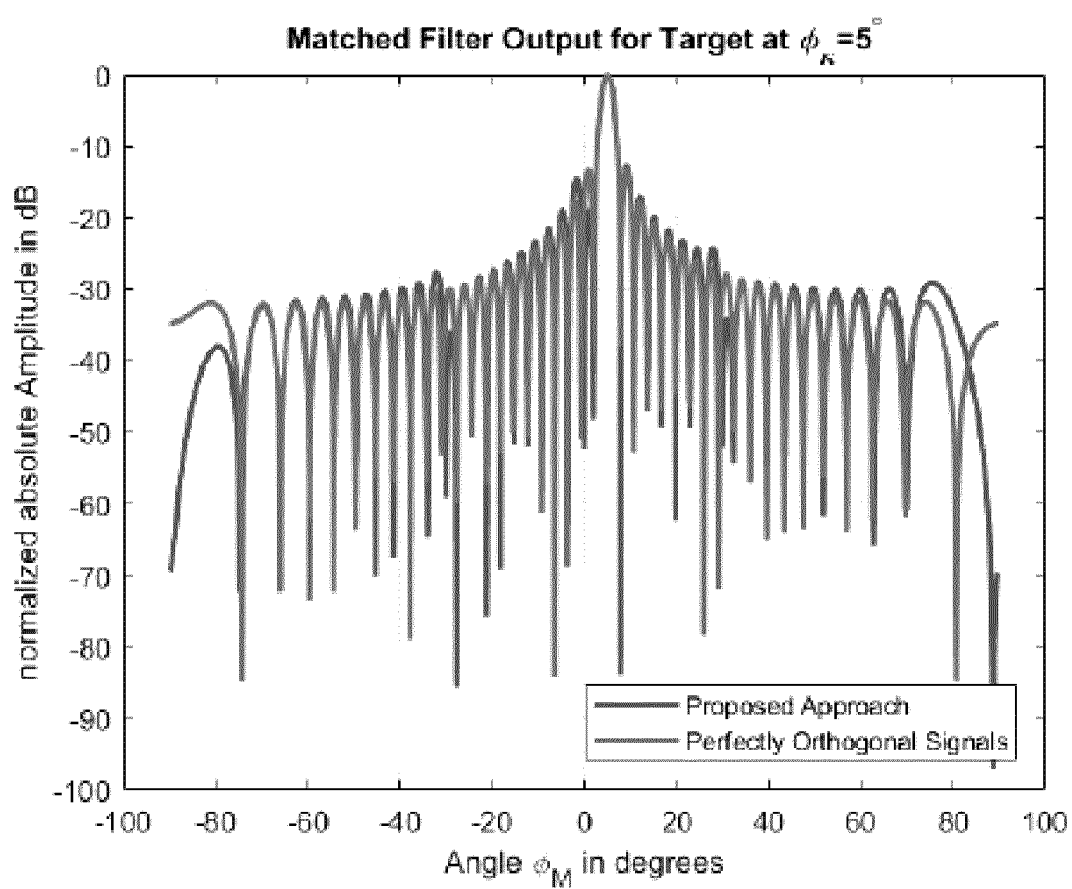
FIG. 7 shows matched filter output using techniques according to another embodiment of the invention and for a perfectly orthogonal signal.

FIG. 7 shows matched filter output using techniques according to another embodiment of the invention and for a perfectly orthogonal signal.

It can be seen that the resolution of the techniques according to an embodiment of the invention is a bit curse and the sidelobes are a bit higher than the matched filter output for the perfectly orthogonal signals. Nevertheless, the mean square error between the techniques according to an embodiment of the invention and perfectly orthogonal signals is about MSE=−35 dB, which confirms the good resolution capability of the techniques according to an embodiment of the invention.

V. Conclusion

The techniques according to an embodiment of the invention are powerful in terms of the deterministic computational complexity, as no iterative algorithm is needed and therefore there are no convergence issues even with hard constraints on the transmitted signal, like QPSK modulation in a multiplexed antenna structure. The capability of shaping the beam pattern with correlated signals, while keeping the resolution characteristic (cross-correlation beam pattern), makes the techniques according to an embodiment of the invention applicable to a virtual MIMO configuration. Further, the techniques according to an embodiment of the invention are applicable to any desired auto-correlation beam pattern, while keeping good resolution properties.

Glossary

| | |
|---|---|
| $f_0 = \frac{\omega_0}{2\pi} = \frac{c_0}{\lambda}$ | Center or carrier frequency |
| $c_0$ | Speed of light |
| $\lambda$ | carrier wavelength |
| $N_c$ | Number of Channels |
| $T_c$ | Pulse duration |
| $N_T$ | Number of transmit antennas |
| $N_R$ | Number of receive antennas |
| $d_T = N_R d_R = \frac{N_R \lambda}{2}$ | Transmit antenna inter element spacing |
| $d_R = \frac{\lambda}{2}$ | Receive antenna inter element spacing |
| B | Signal Bandwidth |
| $I_c$ | Number of pulses |
| K | Number of Targets |
| $T_s$ | Sampling time |
| $I_s$ | Number of intra-pulse samples |
| $p \in \mathbb{C}^{I_s \times 1}$ | Sampled FMCW downmixed pulse vector |
| $s \in \mathbb{C}^{I_c N_T \times 1}$ | Signal modulation vector |
| $\Omega = \{-1, 1, j, -j\}$ | Set of discrete phases (QPSK) |
| $\Omega_0 = \Omega \cup \{0\}$ | Set of discrete phases + zero |
| $x \in \mathbb{C}^{I_s I_c N_T \times 1}$ | Transmit signal vector |
| $\hat{p}_\kappa \in \mathbb{C}^{I_s \times 1}$ | Delayed pulse vector by κ-th target |
| $t_\kappa$ | Propagation delay of κ-th target |
| $r_\kappa$ | κ-th target range |
| $\omega_{B_\kappa}$ | Beat frequency for the κ-th target |
| $\omega_{D_\kappa}$ | Doppler frequency for the κ-th target |
| $H_\kappa$ | Channel matrix for the κ-th target |
| $D_{\omega_{D_\kappa}}$ | Doppler shift matrix for the κ-th target |
| $\alpha_\kappa$ | Attenuation factor for the κ-th target |
| m | Receive steering vector index |
| n | Transmit steering vector index |
| $k_0 = \frac{2\pi}{\lambda}$ | Free space wavenumber |
| $a_{R_\kappa}$ | Receive steering vector |
| $a_{T_\kappa}$ | Transmit steering vector |
| $\hat{y}$ | Received signal vector |
| y | Inter pulse receive signal vector |
| $\phi_\kappa$ | κ-th target angle of arrival |
| $\phi_M$ | Matched filter angle of arrival |
| $\omega_{D_M}$ | Matched filter Doppler shift |
| $H_M$ | Matched filter channel matrix |
| $\sigma_\kappa$ | RCS variance of the κ-th target |
| $i_c$ | Pulse index |
| $\tilde{s}_{i_c}$ | Modulation vector for the $i_c$-th pulse |
| $R_{\tilde{s}}$ | Transmitted signal covariance matrix |
| $\tilde{S}$ | Probing signal matrix |
| $P_d$ | Desired radiation pattern matrix |
| $N_\kappa$ | Sample number target space |
| $N_M$ | Sample number matched filter space |
| $A_{TM}$ | Matched filter transmit steering vector matrix |
| $A_{T\kappa}$ | κ-th target transmit steering vector matrix |
| D | Discrete Fourier Transform (DFT) matrix |
| $N_B$ | Number of blocks |
| $\Lambda$ | Eigenvalue matrix of signal covariance matrix |
| $\lambda_n$ | n-th Eigenvalue matrix of signal covariance matrix |
| $\Psi_b$ | Eigenvalue matrix of the b-th block circulant matrix |

| | |
|---|---|
| $c_b$ | Column vector which parametrize the b-th block circulant matrix |
| $r_{cb}$ | Autocorrelation function |

REFERENCES

[1] T. Aittomaki and V. Koivunen *Low-Complexity Method For Transmit Beamforming in MIMO Radars*, IEEE Proceedings in International Conference on Acoustics, Speech and Signal Processing (ICASSP) 2007.

[2] T. Aittomaki and V. Koivunen *Signal Covariance Matrix Optimization for Transmit Beamforming in MIMO Radars*, Asilomar Conference on Signals, Systems and Computers 2007.

[3] D. Fuhrmann and G. San Antonio *Transmit Beamforming for MIMO Radar Systems using Signal Cross-Correlation*, IEEE Trans. on Aerospace and Electronic Systems vol. 44, no. 1 Jan. 2008.

[4] P. Stoica, J. Li and X. Zhu *Waveform Synthesis for Diversity-Based Transmit Beampatter Design*, IEEE Trans. Signal Process. vol. 56, no. 6 Jun. 2008.

[5] S. Ahmed, J, Thompson, Y. Petillot and B. Mulgrew *Unconstraint Synthesis of Covariance Matrix for MIMO Radar Transmit Beampattern*, IEEE Trans. Signal Process. vol. 59, no. 8 Aug. 2011.

[6] G. Hua and S. Abeysekera *MIMO Radar Transmit Beampattern Design With Ripple and Transition Band Control*, IEEE Trans. Signal Process. vol. 61, no. 11 Jun. 2013.

[7] T. Yang, T. Su, W. Zhu and H. Wu *Transmit waveform synthesis for MIMO radar using spatial-temporal decomposition of correlation matrix*, IEEE Proceedings in Radar Conference 2014.

[8] P. Stoica, H. He and J. Li *New Algorithms for Designing Unimodular Sequences With Good Correlation Properties*, IEEE Trans. Signal Process. vol. 57, no. 4 Apr. 2009.

[9] M. Soltanalian and P. Stoica *Computational Design of Sequences With Good Correlation Properties*, IEEE Trans. Signal Process. vol. 60, no. 5 May 2012.

[10] P. Stoica, J. Li and Y. Xie *On Probing Signal Design For MIMO Radar*, IEEE Trans. Signal Process. vol. 55, no. 8 Aug. 2007.

[11] M. Soltanalian, H. Hu and P. Stoica *Single-stage transmit beamforming design for MIMO radar*, Elsevier Signal Processing 102 132-138 2014.

[12] M. Soltanalian and P. Stoica *Designing Unimodular Codes Via Quadratic Optimization*, IEEE Trans. Signal Process. vol. 62, no. 5 Mar. 2014.

[13] M. Soltanalian, B. Tang, J. Li and P. Stoica *Joint Design of the Receive Filter and Transmit Sequence for Active Sensing*, IEEE Signal Processing Letters vol. 20, no. 5 May 2013.

[14] J. Li, P. Stoica and X. Zheng *Signal Synthesis and Receiver Design for MIMO Radar Imaging*, IEEE Trans. Signal Process. vol. 56, no. 8 Aug. 2008.

[15] J. Yang, W. Li and X. Shi *Phase Modulation Tequnique for FourDimensional Arrays*, IEEE Antennas and Wireless Propagation Letters vol. 13 2014.

[16] P. Rocca, L. Poli, G. Oliveri and A. Massa *Adaptive Nulling in Time-Varying Scenarios Through Time-Modulated Linear Arrays*, IEEE Antennas and Wireless Propagation Letters vol. 11 2012.

[17] Y. Tong and A. Tennant *A Two-Channel Time Modulated Linear Array With Adaptive Beamforming*, IEEE Transactions on Antennas and Propagation vol. 60, no. 1 Jan. 2012.

[18] J. Guo, S. Qu, J. Hu and Z. Nie *A Study on Linear Frequency Modulation Signal Transmission by 4-D Antenna Arrays*, IEEE Transactions on Antennas and Propagation vol. 63, no. 12 Dec. 2015.

[19] D. Bliss, K. Forsythe, G. Fawcett, "*MIMO Radar: Resolution, Performance, and Waveforms*," in Proceedings of ASAP, 2006.

[20] Z. Yang, L. Xie and P. Stoica *Vandermonde Decomposition of Multilevel Toeplitz Marices With Application to Multidimensional Super-Resolution*, IEEE Transactions on Information Theory 2016.

[21] R. Gray *Toeplitz and Circulant Matrices: A review*, Deptartment of Electrical Engineering Stanford University.

[22] M. B. Kilani, Y. Nij sure, G. Gagnon, G. Kaddoum, F. Gagnon, *Cognitive waveform and receiver selection mechanism for multistatic radar*, IET Radar, Sonar and Navigation, 2015.

The invention claimed is:

1. A method of sensing a target in a target detection system comprising processing circuitry and a multiplexer coupled to the processing circuitry and to a plurality NT of transmit antennas forming a sparse transmit uniform linear array (ULA), the multiplexer being configured to generate multiplexed and phase modulated transmit signals $(T_1 \ldots T_{NT})$ based on signals from a local oscillator, the processing circuitry being further coupled for receiving signals via a plurality $N_R$ of receive antennas forming a dense receive ULA, the method comprising:

transmitting the plurality of transmit signals via the transmit antennas so as to form a general radiation pattern corresponding to a block circulant probing signal matrix, wherein an eigenvector matrix of the block circulant probing signal matrix is a Discrete Fourier Transform (DFT) matrix with orthonormal eigenvectors;

receiving via the receive antennas receive signals resulting from backscattering of the plurality of transmit signals transmitted towards K targets;

processing the received reflection signals to determine the presence, range and/or angular position of a target within a field of view of the transmit antennas; and performing beam pattern adaptation to generate an adapted radiation pattern corresponding to an adapted block circulant probing signal matrix.

2. The method according to claim 1, wherein the block circulant probing signal matrix $\tilde{S}$ is given by $$\tilde{S}=(\tilde{s}_1 \ldots \tilde{s}_{i_c} \ldots \tilde{s}_{I_c})=(B_1 \ldots B_{b'} \ldots B_{N_B})$$

where each block circulant matrix $B_b \in \mathbb{C}^{N_T \times N_T}$ is parametrized by a single column vector $c_b \in \mathbb{C}^{N_T \times 1}$.

3. The method according to claim 1 further comprising generating Quadrature Phase Shift Keyed (QPSK) signals based on pulse signals from the local oscillator.

4. The method according to claim 3, further comprising multiplexing with the multiplexor the QPSK signals over a plurality of transmit channels, for transmission via the transmit antennas.

5. The method according to claim 4, wherein the number of transmit channels is two.

6. The method according to claim 1, wherein the beam pattern adaptation is performed in a single execution of an adaptation procedure.

7. The method according to claim 1, wherein performing beam pattern adaptation includes determining an overall auto-correlation function as a superposition of $N_B$ block matrix vector auto-correlation function $r(\tau)=\Sigma_{b=1}^{N_b} r_{c_b}(\tau)$, where $r_{c_b}(\tau)=\Sigma_{\gamma=1}^{N_T}[c_b]_{\gamma+\tau}[c_b^H]_\gamma$ is a block matrix vector auto-correlation function, $\tau$ is a relative shift between vector elements, $N_T$ is the number of transmit antennas and $c_b$ is a column vector which parametrizes the b-th block circulant matrix.

8. The method according to claim 1, wherein performing beam pattern adaptation includes initializing desired beam pattern $P_d(\varphi)$ to a prior beam pattern from a prior target detection, or else when there is no prior beam pattern from a prior target detection the desired beam pattern is set as a constant.

9. The method according to claim 8, further comprising generating a Fourier series approximation of desired beam pattern $P_d(\varphi)$, the Fourier series approximation including Fourier coefficients.

10. The method according to claim 9, further comprising discretizing the Fourier coefficients.

11. The method according to claim 10, further comprising mapping the discrete Fourier coefficients to an adapted block circulant probing signal matrix using the Na basis functions.

12. The method according to claim 11, further comprising applying target detection using a matched filter output threshold and repeating the following step on the basis of the target detection applied:
  determining an overall auto-correlation function as a superposition of block matrix vector auto-correlation function $r(\tau)=\Sigma_{b=1}^{N_b} r_{c_b}(\tau)$, where $r_{c_b}(\tau)=\Sigma_{\gamma=1}^{N_T}[c_b]_{\gamma+\tau}[c_b^H]_\gamma$ is a block vector auto-correlation function, $\tau$ is a relative shift between vector elements, $N_T$ is the number of transmit antennas and $C_b$ is a column vector which parametrizes the b-th block circulant matrix.

13. A detection system for sensing a target, the system comprising:
  a multiplexer coupled to a plurality $N_T$ of transmit antennas forming a sparse transmit uniform linear array (ULA), and a plurality $N_R$ of receive antennas forming a dense receive ULA, the multiplexer being configured to generate multiplexed transmit signals ($T_1 \ldots T_{NT}$) based on signals from a local oscillator; and
  processing circuitry, the processing circuitry being coupled to the multiplexer, the transmit antennas and the receive antennas and being configured to perform the method of claim 1.

14. A vehicle comprising the detection system according to claim 13.

* * * * *